(12) United States Patent  
Sjödin et al.

(10) Patent No.: US 10,421,141 B2  
(45) Date of Patent: Sep. 24, 2019

(54) BRAZING CONCEPT

(71) Applicant: ALFA LAVAL CORPORATE AB, Lund (SE)

(72) Inventors: Per Sjödin, Lund (SE); Kristian Walter, Genarp (SE)

(73) Assignee: ALFA LAVAL CORPORATE AB, Lund (SE)

( * ) Notice: Subject to any disclaimer, the term of this patent is extended or adjusted under 35 U.S.C. 154(b) by 620 days.

(21) Appl. No.: 14/383,078

(22) PCT Filed: Mar. 27, 2013

(86) PCT No.: PCT/EP2013/056500  
§ 371 (c)(1),  
(2) Date: Sep. 4, 2014

(87) PCT Pub. No.: WO2013/144194  
PCT Pub. Date: Oct. 3, 2013

(65) Prior Publication Data  
US 2015/0030837 A1    Jan. 29, 2015

(30) Foreign Application Priority Data  
Mar. 28, 2012    (EP) .................... 12161742

(51) Int. Cl.  
*B23K 1/20* (2006.01)  
*B23K 35/30* (2006.01)  
(Continued)

(52) U.S. Cl.  
CPC ............... *B23K 1/20* (2013.01); *B21D 53/04* (2013.01); *B22F 1/0059* (2013.01); *B23K 1/00* (2013.01);  
(Continued)

(58) Field of Classification Search  
CPC ........ B23K 1/00; B23K 1/0012; B23K 35/30; B23K 35/025; B23K 35/24–327; B22F 1/0059  
(Continued)

(56) References Cited

U.S. PATENT DOCUMENTS

| 3,262,762 A | 7/1966 | Bechtold et al. |
| 4,516,716 A | 5/1985 | Coad |

(Continued)

FOREIGN PATENT DOCUMENTS

| CN | 1474732 A | 2/2004 |
| CN | 1514758 A | 7/2004 |

(Continued)

OTHER PUBLICATIONS

"Brazing Aids", Jan. 1, 2015, WallColmonoy, http://www.wallcolmonoy.com/products-capabilities/brazing-alloys/brazing-aids/.*

(Continued)

*Primary Examiner* — Scott R. Walshon  
*Assistant Examiner* — Jasper Saberi  
(74) *Attorney, Agent, or Firm* — Birch, Stewart, Kolasch & Birch, LLP

(57) ABSTRACT

The present invention relates to an intermediate product for joining and coating by brazing comprising a base metal and a blend of boron and silicon, said base metal having a solidus temperature above 1040° C., and the intermediate product has at least partly a surface layer of the blend on the base metal, wherein the boron in the blend is selected from a boron source, and the silicon in the blend is selected from a silicon source, and wherein the blend comprises boron and silicon in a ratio of boron to silicon within a range from about 3:100 wt/wt to about 100:3 wt/wt. The present invention relates also to a stacked intermediate product, to an assembled intermediate product, to a method of brazing, to a brazed product, to a use of an intermediate product, to a pre-brazed product, to a blend and to paint.

27 Claims, 3 Drawing Sheets

(51) Int. Cl.
| | |
|---|---|
| *B22F 1/00* | (2006.01) |
| *B23K 35/365* | (2006.01) |
| *B23K 35/00* | (2006.01) |
| *B23K 35/02* | (2006.01) |
| *C22C 19/00* | (2006.01) |
| *C22C 1/02* | (2006.01) |
| *B23K 1/00* | (2006.01) |
| *B23K 35/24* | (2006.01) |
| *B23K 35/34* | (2006.01) |
| *B23K 35/362* | (2006.01) |
| *C23C 30/00* | (2006.01) |
| *B21D 53/04* | (2006.01) |
| *F28D 9/00* | (2006.01) |
| *B32B 15/01* | (2006.01) |
| *C23C 24/10* | (2006.01) |
| *B23K 20/00* | (2006.01) |
| *B23K 20/24* | (2006.01) |
| *B23K 35/36* | (2006.01) |
| *B23K 101/00* | (2006.01) |
| *F28F 3/04* | (2006.01) |
| *F28F 21/08* | (2006.01) |

(52) U.S. Cl.
CPC .......... *B23K 1/0008* (2013.01); *B23K 1/0012* (2013.01); *B23K 1/203* (2013.01); *B23K 20/002* (2013.01); *B23K 20/24* (2013.01); *B23K 35/00* (2013.01); *B23K 35/001* (2013.01); *B23K 35/004* (2013.01); *B23K 35/007* (2013.01); *B23K 35/02* (2013.01); *B23K 35/025* (2013.01); *B23K 35/0244* (2013.01); *B23K 35/24* (2013.01); *B23K 35/30* (2013.01); *B23K 35/34* (2013.01); *B23K 35/36* (2013.01); *B23K 35/362* (2013.01); *B23K 35/365* (2013.01); *B23K 35/3613* (2013.01); *B32B 15/01* (2013.01); *C22C 1/02* (2013.01); *C22C 19/00* (2013.01); *C23C 24/10* (2013.01); *C23C 30/00* (2013.01); *C23C 30/005* (2013.01); *F28D 9/0062* (2013.01); *B23K 2101/00* (2018.08); *F28D 9/0012* (2013.01); *F28F 3/042* (2013.01); *F28F 21/083* (2013.01); *F28F 21/089* (2013.01); *Y10T 29/49366* (2015.01); *Y10T 403/479* (2015.01); *Y10T 428/12778* (2015.01); *Y10T 428/12986* (2015.01); *Y10T 428/25* (2015.01); *Y10T 428/259* (2015.01); *Y10T 428/266* (2015.01); *Y10T 428/273* (2015.01); *Y10T 428/2924* (2015.01); *Y10T 428/2982* (2015.01)

(58) Field of Classification Search
USPC .......................... 148/23–24; 228/248.1–248.5
See application file for complete search history.

(56) References Cited

U.S. PATENT DOCUMENTS

| | | | | |
|---|---|---|---|---|
| 4,614,296 | A | | 9/1986 | Lesgourgues |
| 6,109,505 | A | * | 8/2000 | Malie ................. B23K 35/0244 228/119 |
| 6,203,897 | B1 | | 3/2001 | Koizumi et al. |
| 6,624,225 | B1 | * | 9/2003 | Ellison .................. B22F 1/0059 524/292 |
| 7,015,451 | B2 | | 3/2006 | Dalke et al. |
| 7,455,811 | B2 | | 11/2008 | Sjodin |
| 2003/0049154 | A1 | * | 3/2003 | Xu .......... B23K 35/28 420/417 |
| 2003/0200835 | A1 | | 10/2003 | Malie et al. |
| 2004/0023056 | A1 | | 2/2004 | Braillard et al. |
| 2004/0035910 | A1 | | 2/2004 | Dockus et al. |
| 2004/0056074 | A1 | | 3/2004 | Sjodin |
| 2005/0067061 | A1 | * | 3/2005 | Huang ............... B23K 35/3033 148/428 |
| 2005/0181231 | A1 | * | 8/2005 | Gupta .................. B23K 1/0008 428/668 |
| 2010/0055495 | A1 | * | 3/2010 | Sjodin ................ B23K 35/3053 428/682 |
| 2010/0059573 | A1 | * | 3/2010 | Kottilingam ........... B23K 1/001 228/164 |
| 2010/0215983 | A1 | | 8/2010 | Patel et al. |
| 2011/0220617 | A1 | * | 9/2011 | Becker ................. B23K 1/0012 219/85.2 |

FOREIGN PATENT DOCUMENTS

| | | |
|---|---|---|
| CN | 1764614 A | 4/2006 |
| CN | 101588890 A | 11/2009 |
| EP | 1245327 A1 | 10/2002 |
| EP | 1 982 781 A1 | 10/2008 |
| EP | 2193874 A1 | 6/2010 |
| JP | 2000-61653 A | 2/2000 |
| JP | 2002-361479 A | 12/2002 |
| JP | 2005-103641 A | 4/2005 |
| JP | 2010-510067 A | 4/2010 |
| KR | 10-2009-0084942 A | 8/2009 |
| RU | 2146187 C1 | 3/2000 |
| RU | 2003117585 A | 1/2005 |
| SU | 199651 A1 | 7/1967 |
| WO | WO 02/098600 A1 | 12/2002 |
| WO | WO 2006/126953 A1 | 11/2006 |
| WO | WO 2008/060225 A1 | 5/2008 |
| WO | WO 2008/060226 A2 | 5/2008 |
| WO | 2009/031545 A1 | 3/2009 |

OTHER PUBLICATIONS

"Paint", Dictionary.com, Mar. 17, 2016, http://www.dictionary.com/browse/paint.*
Canadian Office Action for Appl. No. 2867427 dated Dec. 19, 2016.
International Search Report, dated Jul. 18, 2013, issued in PCT/EP2013/056500.
Written Opinion of the International Searching Authority, dated Jul. 18, 2013, issued in PCT/EP2013/056500.
English translation of the Japanese Office Action for Japanese Application No. 2015-502320, dated Nov. 2, 2015.
English translation of the Korean Office Action for Korean Application No. 10-2014-7026749, dated Nov. 4, 2015.
Singaporean Office Action and Search Report for Singaporean Application No. 11201406089X, dated Oct. 9, 2015.
English translation of the Chinese Office Action and Search Report dated Oct. 21, 2015, for Chinese Application No. 201380016844.9.
English Translation of Russian Office Action and Search Report, dated Dec. 17, 2015, for Russian Application No. 2014143279/02.

* cited by examiner

BRAZING CONCEPT

The present invention relates to a novel brazing concept, an intermediate product for joining and/or coating by brazing. The present invention relates also to a stacked intermediate product, to an assembled intermediate product, to a method of brazing, to a brazed product obtained by the method, to a use of an intermediate product, to a pre-brazed product, to a blend and to paint.

BACKGROUND

Today there are different joining methods for joining together alloys having high melting temperatures. By high temperature a melting temperature higher than 900° C. is intended. One common method which is used is welding. Welding refers to a method wherein the base material with or without additional material is melted, i.e. creation of a cast product via melting and re-solidification. Another joining method is brazing. During the brazing process a braze filler is added to the base material, and the braze filler is melted during the process at a temperature above 450° C., i.e. forming a liquid interface, at a temperature lower than liquidus temperature of the base material to be joined. When brazing the liquid interface should have good wetting and flow. Soldering is a process in which two or more metal items are joined together by melting and flowing of a filler metal, i.e. a solder, into the joint, the solder having a lower melting point than the work-piece. In brazing, the filler metal melts at a higher temperature than the solder, but the work-piece metal does not melt. The distinction between soldering and brazing is based on the melting temperature of the filler alloy. A temperature of 450° C. is usually used as a practical delineating point between soldering and brazing.

When brazing a braze filler is applied in contact with the gap or the clearance between the base material to be joined. During the heating process the braze filler melts and fills the gap to be joined. In the brazing process there are three major stages the first stage is called the physical stage. The physical stage includes wetting and flowing of the braze filler. The second stage normally occurs at a given joining temperature. During this stage there is solid-liquid interaction, which is accompanied by substantial mass transfer. The base material volume that immediately adjoins the liquid filler metal either dissolves or is reacted with the filler metal in this stage. At the same time a small amount of elements from the liquid phases penetrates into the solid base material. This redistribution of components in the joint area results in changes to the filler metal composition, and sometimes, the onset of solidification of the filler metal. The last stage, which overlaps the second, is characterized by the formation of the final joint microstructure and progresses during solidification and cooling of the joint.

A method closely related to welding and brazing is diffusion brazing (DFB) also called Transient Liquid-phase bonding (TLP), or Activated Diffusion Bonding (ADB). Sometimes diffusion bonding is mentioned, but diffusion bonding refers to diffusion brazing or diffusion welding and now diffusion bonding is considered to be a non-standard term.

Diffusion brazing (DFB), Transient Liquid-phase bonding (TLP), or Activated Diffusion Bonding (ADB) is a process that coalesces, or joins, metals by heating them to a suitable brazing temperature at which either a preplaced filler metal will melt or flow by capillary attraction or a liquid phase will form in situ between two surfaces in contact with each other. In either case, the filler metal diffuses into the base material until the physical and mechanical properties of the joint become almost identical to those of the base metal. Two critical aspects of DFB, TLP, or ADB are that:
 a liquid must be formed and become active in the joint area; and
 extensive diffusion of the filler metal elements into the base material must occur.

Ways of obtaining a joint close or the same as the one obtained when DFB, TLP, or ADB is used, but has the advantage of brazing, e.g having the possibility to braze larger gaps etc, is by using a brazing technique and braze fillers disclosed by WO 2002/38327, WO 2008/060225 and WO 2008/060226. By using a braze filler, i.e. a braze alloy, with a composition close to the base material but with added melting point depressants, e.g. silicon and/or boron and/or phosphorus. By doing this the braze joint will have a composition close to the base material after brazing since braze filler had a similar composition as the base material, the braze filler blends with the base material due to dissolution of the base material and the melting point depressants diffuses into the base material.

There are many reasons for selecting a certain joining method, such as cost, productivity, safety, speed and properties of the joined product. Closely related E-modules will decrease the risk of high stresses in the material with higher E-module when the material is loaded. When the thermal expansion coefficient is similar the result will decrease the thermally induced stresses. When the electrochemical potential is similar the result will decrease the risk for corrosion.

The use of fillers, i.e. alloys, when joining base metals is a complicated process. The filler has to be in a form that could be applied to the base metal before heating. Usually the fillers are particles suitably produced by atomization, but the fillers may also be in form of foils produced by "melt-spinning", i.e. rapid solidification (RS). Regarding RS only a limited number of compositions are possible to produce by RS. The number of compositions that can be made as particles, i.e. powder, is greater and the normal production of powders is by atomizing. When the fillers are in form of powders then they are often combined with binders to form a paste, which could be applied to the base metal in any suitable way. To produce foils or to produce alloy powders are complicated processes and therefore costly. When powders are used the powders are suitable applied in form of a paste as mentioned above, this will add an extra step to the process since the paste need to be blended with the binders and other components, which are beneficial for the paste's properties. For both processes a great amount of work is carried out to get the right form, properties, shape and composition of the filler before melting and joining. Therefore, one purpose for the invention is to reduce the process steps when joining base metals. Another purpose is to simplify the joining of the base metals and thus reduce costs.

If possible, when selecting braze fillers, a composition close to the base material is beneficial, since the base material has been selected for the product purposes. If it would have been possible and cost was no limit, it would be best to develop one braze filler for each base material. Therefore another purpose with the invention is to decrease the needed number of braze fillers.

THE INVENTION

Accordingly, the present invention provides a solution to the technical problems and purposes by the novel and inventive brazing concept. The first aspect relates to a blend for brazing of joints in products of base metals and/or for coating of products of base metals, which base metal has a solidus temperature above 1040° C. The blend comprises boron and silicon, the boron is selected from a boron source, and the silicon is selected from a silicon source. The blend comprises boron and silicon in a ratio boron to silicon within a range from about 3:100 wt/wt to about 100:3 wt/wt and wherein the blend also comprises at least one binder selected from the group consisting of solvents, water, oils, gels, lacquers, varnish, binders based on monomers and/or polymers.

As an example may the ratio of boron and silicon in the blend be within a range from about 5:100 wt/wt to about 1:1 wt/wt. According to another example may the ratio of boron and silicon in the blend be within a range from about 1:10 wt/wt to about 7:10 wt/wt. According to a further example may the blend have a ratio boron to silicon within a range from about 15:100 wt/wt to about 4:10 wt/wt. The ratios are weight by weight.

According to one example the blend is for brazing of joints in products of base metals and/or for coating of products of base metals, which base metal has a solidus temperature above 1040° C. The blend comprises boron and silicon, the boron is selected from a boron source, and the silicon is selected from a silicon source. The blend comprises boron and silicon in a ratio boron to silicon within a range from 1:10 wt/wt to about 7:10 wt/wt and wherein the blend also comprises one binder said binder being a lacquer or a gel.

As another example the blend may be used for brazing of joints in products of base metals and/or for coating of products of base metals, which base metal has a solidus temperature above 1040° C. The blend comprises boron and silicon, the boron is selected from a boron source, and the silicon is selected from a silicon source. The blend comprises boron and silicon in a ratio boron to silicon within a range from about 3:100 wt/wt to about 100:3 wt/wt and wherein the blend also comprises at least one binder selected from polyesters, polyethylene, polypropylene, acrylic polymers, (met)acrylic polymers, polyvinyl alcohol, polyvinyl acetate, polystyrene.

Examples of particles size for the blend comprising boron and silicon, wherein the boron is selected from a boron source, and wherein the silicon is selected from silicon source may comprise particles having a particle size less than 250 µm. Another example of particles size may be less than 160 µm. A further example may be a particle size less than 100 µm. A further example may be a particle size less than 50 µm.

The blend of boron and silicon may be any type of blend between boron and silicon. Boron may be a boron source. Examples of boron sources may be boron, $B_4O$, $B_4Si$, NiB, and FeB. Silicon may be a silicon source. Examples of Silicon source may be silicon, FeSi, SiC, and $B_4Si$.

According to a further example the blend is for brazing of joints in products of base metals and/or for coating of products of base metals, which base metal has a solidus temperature above 1040° C. The blend comprises boron and silicon. The blend comprises boron and silicon in a ratio boron to silicon within a range from 1:10 wt/wt to about 7:10 wt/wt and wherein the blend also comprises one binder said binder being a lacquer or a gel.

As a further example may the blend also comprises powders of base metal having a solidus temperature above 1040° C.

As an example may the blend be a paint. The paint comprises boron and silicon in a ratio boron to silicon within a range from 1:10 wt/wt to about 7:10 wt/wt and wherein the blend also comprises one binder said binder being a lacquer.

As a further example the blend may be a paint. The paint comprises boron and silicon in a ratio boron to silicon within a range from 1:10 wt/wt to about 7:10 wt/wt. The pant comprises particles having particle size less than 50 µm and at least one binder may be selected from polyesters, polyethylene, polypropylene, acrylic polymers, (met)acrylic polymers, polyvinyl alcohol, polyvinyl acetate, polystyrene.

The second aspect relates to an intermediate product for joining and/or coating by brazing. The intermediate product comprises plates and/or parts of products of a base metal, which base metal has a solidus temperature above 1040° C. The intermediate product which comprises also at least part of the base metal has a surface layer of a blend, which blend comprises boron (B) and silicon (Si), wherein boron is selected from a boron source, and wherein silicon is selected from a silicon source. Boron and silicon in the blend are in a ratio boron to silicon within a range from about 3:100 wt/wt to about 100:3 wt/wt (weight by weight).

The new brazing concept provides for example joints which are obtained by a brazing alloy, which brazing alloy is formed in a melting process of the base metal and a blend of boron and silicon. The brazing alloy in melted form has been transported by capillary forces to the area of the joint mainly from neighboring areas. The temperature for the brazing concept is above 900° C., i.e. above delineating point between soldering and brazing. The formed brazing alloy is an alloy which has a part for the elements of a base metal liquidus temperature lowering elements. Therefore, the brazing alloy has a liquidus temperature lower than the base alloy.

The base metal is an alloy comprising elements such as iron (Fe), chromium (Cr), nickel (Ni), molybdenum (Mo), manganese (Mn), copper (Cu), etc. According to one example may the base metal be selected from the group consisting of iron-based-alloys, nickel-based alloys, chromium-based alloys, and copper based alloys. Examples of such alloys are found in the list in Table 1, the base metals are not limited to the list and is just examples of possible base metals.

According to one example the intermediate product may comprise plates and/or parts of products of a base metal, which base metal has a solidus temperature above 1040° C. The intermediate product which comprises also at least part of the base metal has a surface layer of a blend, which blend comprises boron (B) and silicon (Si), wherein boron is selected from a boron source, and wherein silicon is selected from a silicon source. Boron and silicon in the blend are in a ratio boron to silicon within a range from within a range from about 5:100 wt/wt to about 1:1 wt/wt. The base metal may be selected from the group consisting of iron-based-alloys, nickel-based alloys, chromium-based alloys, and copper based alloys.

According to a further example the intermediate product may comprise plates and/or parts of products of a base metal, which base metal has a solidus temperature above 1040° C. The intermediate product which comprises also at least part of the base metal has a surface layer of a blend, which blend comprises boron (B) and silicon (Si), wherein boron is selected from a boron source, and wherein silicon is selected from a silicon source. Boron and silicon in the blend are in a ratio boron to silicon within a range from within a range from about 5:100 wt/wt to about 1:1 wt/wt. The blend may comprise one binder said binder being a lacquer or a gel. The base metal may be selected from the group consisting of iron-based-alloys, nickel-based alloys, chromium-based alloys, and copper based alloys.

TABLE 1

| Base metal | Approximate. solidus temperature [° C.] | Approximate. liquidus temperature [° C.] |
|---|---|---|
| Nickel 200/201 | 1435 | 1445 |
| Nicrofer 5923hMo | 1310 | 1360 |
| Hastelloy ® C-2000 ® Alloy | 1328 | 1358 |
| Hastelloy B3 | 1370 | 1418 |
| Alloy C22 | 1357 | 1399 |
| Inconel 625 | 1290 | 1350 |
| Alloy C 276 | 1325 | 1370 |
| Nicrofer 3033 | 1330 | 1370 |
| Nicrofer 3127HMo | 1350 | 1370 |
| AL6XN | 1320 | 1400 |
| 254SMO | 1325 | 1400 |
| Monel 400 | 1299 | 1348 |
| Pure Cu | 1085 | 1085 |
| Mild steel | 1505 | 1535 |
| Stainless steel Type 316 | 1390 | 1440 |
| Stainless steel type 304 | 1399 | 1421 |

According to one example may the intermediate product comprises plates and/or parts of products of a base metal, which base metal has a solidus temperature above 1040° C. and the base metal may comprise from about 15 to about 22 wt % chromium, from about 8 to about 22 wt % nickel, from about 0 to about 3 wt % manganese, from about 0 to about 1.5 wt % silicon, optionally from about 1 to about 8 wt % molybdenum, and balanced with iron, all percentage in percent by weight. The intermediate product which comprises also at least part of the base metal has a surface layer of a blend, which blend comprises boron (B) and silicon (Si), wherein boron is selected from a boron source, and wherein silicon is selected from a silicon source. Boron and silicon in the blend are in a ratio boron to silicon within a range from about 3:100 wt/wt to about 100:3 wt/wt (weight by weight).

According to another example may the intermediate product comprises plates and/or parts of products of a base metal, which base metal has a solidus temperature above 1040° C. and the base metal may comprise from about 15 to about 22 wt % chromium, from about 8 to about 22 wt % nickel, from about 0.2 to about 3 wt % manganese, from about 0.1 to about 1.5 wt % silicon, optionally from about 1 to about 8 wt % molybdenum, and balanced with iron, all percentage in percent by weight. The intermediate product which comprises also at least part of the base metal has a surface layer of a blend, which blend comprises boron (B) and silicon (Si), wherein boron is selected from a boron source, and wherein silicon is selected from a silicon source. Boron and silicon in the blend are in a ratio boron to silicon within a range from 1:10 wt/wt to about 7:10 wt/wt.

According to another example may the base metal comprise from about 15 to about 22 wt % chromium, from about 8 to about 22 wt % nickel, from about 1 to about 3 wt % manganese, from about 0.5 to about 1.5 wt % silicon, optionally from about 1 to about 8 wt % molybdenum, and balanced with iron.

Depending on which alloys are used, i.e. base metals, there are different base metals having different solidus temperature, i.e. the temperature point at which a material solidifies. According to one example the solidus temperature of the base metal may be above 1100° C. According to one example of the invention the solidus temperature of the base metal may be above 1220° C. According to another example may the solidus temperature of the base metal be above 1250° C. According to a further alternative of the invention may the solidus temperature of the base metal be above 1300° C.

According to one example the blend according to the second aspect may have a ratio boron to silicon within a range from about 5:100 wt/wt to about 1:1 wt/wt. According to another example the blend may have a ratio boron to silicon within a range from about 1:10 wt/wt to about 7:10 wt/wt. According to a further example may the blend have a ratio boron to silicon within a range from about 15:100 wt/wt to about 4:10 wt/wt.

The blend of boron and silicon according to the second aspect may be any type of blend between boron and silicon. Boron may be a boron source, which could be selected within the group consisting of boron, $B_4C$, $B_4Si$, NiB, and FeB. Silicon may be a silicon source which could be selected within the group consisting of silicon, FeSi, SiC, and $B_4Si$.

The blend according to the second aspect may comprise particles having a particle size less than 250 µm. According to one alternative may the particle size be less than 160 µm. According to another alternative may the particle size be less than 100 µm. According to a further alternative may the particle size less than 50 µm.

As an example the blend according to the second aspect may also comprises at least one binder selected from the group consisting of solvents, water, oils, gels, lacquers, varnish, binders based for example on monomers or polymers. The binder may be selected from polyesters, polyethylene, polypropylene, acrylic polymers, (met)acrylic polymers, polyvinyl alcohol, polyvinyl acetate, polystyrene etc.

According to one example the intermediate product may comprise plates and/or parts of products of a base metal, which base metal has a solidus temperature above 1040° C. The intermediate product comprises also at least part of the base metal has a surface layer of a blend, which blend comprises boron (B) and silicon (Si), wherein boron is selected from a boron source, and wherein silicon is selected from a silicon source. Boron and silicon in the blend are in a ratio boron to silicon within a range from within a range from about 5:100 wt/wt to about 1:1 wt/wt. The blend may comprise one binder said binder being a lacquer or a gel.

The surface layer may be applied as a powder of the blend or by means such as physical vapor deposition (PVD), or chemical vapor deposition (CVD). Physical vapor deposition (PVD) is a variety of vacuum deposition and is a general term used to describe any of a variety of methods to deposit thin films by the condensation of a vaporized form of the desired film material onto various work-piece surfaces, e.g. onto semiconductor wafers. The coating method involves purely physical processes such as high temperature vacuum evaporation with subsequent condensation, or plasma sputter bombardment rather than involving a chemical reaction at the surface to be coated as in chemical vapor deposition. Chemical vapor deposition (CVD) is a chemical process used to produce high-purity, high-performance solid materials. The process is for example used in the semiconductor industry to produce thin films. In a typical CVD process, the wafer, i.e. the substrate, is exposed to one or more volatile precursors, which react and/or decompose on the substrate surface to produce the desired deposit. Frequently, volatile by-products are also produced, which are removed by gas flow through the reaction chamber.

According to one example the intermediate product may comprise plates and/or parts of products of a base metal, which base metal has a solidus temperature above 1040° C. The intermediate product comprises also at least part of the base metal has a surface layer of a blend, which blend comprises boron (B) and silicon (Si), wherein boron is selected from a boron source, and wherein silicon is selected from a silicon source. The surface layer may be applied as a powder of the blend. Boron and silicon in the blend are in a ratio boron to silicon within a range from within a range from about 5:100 wt/wt to about 1:1 wt/wt. The blend may comprise one binder said binder being a lacquer or a gel.

According to one example the intermediate product may comprise plates and/or parts of products of a base metal, which base metal has a solidus temperature above 1040° C. The intermediate product comprises also at least part of the base metal has a surface layer of a blend, which blend comprises boron (B) and silicon (Si), wherein boron is selected from a boron source, and wherein silicon is selected from a silicon source. The surface layer may be applied as a powder of the blend. Boron and silicon in the blend are in a ratio boron to silicon within a range from within a range from 1:10 wt/wt to about 7:10 wt/wt. The blend may comprise one binder said binder being a lacquer or a gel.

The base metal of the invention may have a thickness <1 mm, i.e. plates having a thickness <1 mm. When the base metal has a thickness <1 mm then the blend may be applied on the base metal in an amount less than 2.9 mg/mm$^2$, preferably in an amount less than 2.8 mg/mm$^2$. The advantage of applying an amount less than 2.9 mg/mm$^2$, preferably in an amount less than 2.8 mg/mm$^2$ is that it decreases or reduces the risk of burning through the plates.

The base metal of the invention may have a thickness ≥1 mm.

The third aspect is related to an intermediate product which may be pre-brazed in such a way that the base metal and the surface layer of the blend is exposed to a temperature higher than the solidus temperature of the formed brazing alloy and lower than the solidus temperature of the base metal. A layer of brazing alloy is formed on the base metal in a pre-brazing step. The brazing alloy in the surface layer comprises the blend of boron (B) and silicon (Si) and the base metal.

When the intermediate products are plates the surface layer of the blend could be on one side of the plates, single surface layer, or on both sides of the plates, double surface layers. The plates may be cut, could be formed, could be pressed or combinations thereof, before the application of the surface layer, after the application of the surface layer, or after the pre-brazing step.

When the intermediate products have other forms the surface layer of the blend could be on one side of the product, single surface layer, or on two sides of the product, double surface layers, or the blend could be on several sides of the product. The product could be cut, could be formed, could be pressed or combinations thereof, before the application of the surface layer, after the application of the surface layer, or after the pre-brazing step.

The fourth aspect relates to a stacked intermediate product for brazing. The stacked product comprises plates which are stacked, and that the surface layers of the plates either are in contact with a base metal on a plate or with another surface layer on another plate. The plates may have no surface layers, single surface layers, double surface layers or combinations thereof. This means that a stacked product could have n−1 single surface layer plates and the last plate has no surface layer. Another example could be to have one or more plates with no surface layers in the middle and stacked on both sides of the middle plate could either single surface layer plates or double surface layers or both. The plates could be pre-brazed. The plates could be stacked in number of different ways.

The fifth aspect relates to an assembled intermediate product for brazing comprising one or more intermediate products, wherein at least one intermediate product has a thickness ≥1 mm, this is the case when plates are thicker than 1 mm or when parts are thicker than 1 mm, and wherein the assembled intermediate product has at least one surface layer in contact with parts of a base metal or in contact with at least one surface layer of a part before brazing, and after brazing brazed joint are obtained in the contact areas.

The sixth aspect relates also to a stacked brazed product or assembled brazed product obtained by brazing a stacked or an assembled intermediate product, wherein the stacked or the assembled intermediate product is brazed at a temperature below 1250° C. in a furnace in vacuum, in an inert gas, in a reducing atmosphere, or combinations thereof forming brazed joints between the stacked plates or the contact surfaces of the assembled intermediate product. The formed brazing alloy is formed in a melting process of the base metal and the blend, and the brazing alloy in melted form has been transported by capillary forces to the area of the joint mainly from neighboring areas. According to another example may the product be brazed at a temperature below 1200° C. According to a further example may the product be brazed at a temperature above 1100° C. According to a further example may the product be brazed within a range from about 1100° C. to about 1250° C.

The seventh aspect relates to a method for brazing a product, which method comprises the following steps:
(i) applying a blend on plates and or parts of products of base metal, said base metal having a solidus temperature above 1040° C., the blend comprises boron and silicon, the boron is selected from a boron source, and the silicon is selected from a silicon source, wherein the blend comprises boron and silicon in a ratio boron to silicon within a range from about 3:100 wt/wt to about 100:3 wt/wt, preferably within a range from about 5:100 wt/wt to about 1:1 wt/wt,
(ii) obtaining an intermediate product;
(iii) optionally exposing the obtained intermediate product in step (ii) to a temperature higher than the solidus temperature of a forming brazing alloy and lower than the solidus temperature of the base metal, and forming a layer of the brazing alloy on the base metal surface in a pre-brazing step;
(iv) assembling or stacking the product from step (ii) or step (iii) with one or more products according to step (ii) or step (iii), or assembling or stacking the product with one or more parts or plates having no blend of silicon and boron, and forming an assembled product or a stacked product;
(v) brazing the assembled or stacked product from step (iv) at a temperature below 1250° C. in a furnace in vacuum, in an inert gas, in a reducing atmosphere or combinations thereof; and
(vi) obtaining a brazed product.

According to an example may the brazed product obtained in step (vi) be provided with a joint(s) obtained by forming a brazing alloy in a melting process of the base metal and the blend, and transporting by capillary forces the brazing alloy in melted form to the area of the joint(s) mainly from neighboring areas.

According to another example may the solidus temperature of the base metal be above 1220° C. According to another alternative of the invention may the solidus temperature of the base metal be above 1250° C. According to a further alternative of the invention may the solidus temperature of the base metal be above 1300° C.

According to one example the obtained product may be brazed at a temperature below 1250° C. According to another example may the product be brazed at a temperature below 1200° C. According to a further example may the product be brazed at a temperature above 1100° C. According to a further example may the product be brazed within a range from about 1100° C. to about 1250° C.

The method may also comprise that in the step (iv) the product is brazed to a base metal having thickness ≥1 mm, or brazed to a base metal having a thickness <1 mm, or brazed to one or more intermediate products according to the invention.

The method may also comprise that in step (ii) or step (iii) the product is cut, formed, pressed or combinations thereof obtaining plates, preferably heat exchanger plates or reactor plates.

The method may also comprise that the obtained product in step (ii) or step (iii) is a plate and that in step (iv) the plates are stacked to produce a heat exchanger or a plate reactor.

The method may also comprise that the obtained brazed product is selected from the group consisting of heat exchangers, plate reactors, parts of reactors, parts of separators, parts of decanters, parts of pumps, part of valves etc.

The eighth aspect relates to a brazed product obtained by the method according to seventh aspect. The joints of the brazed product are obtained by the formed brazing alloy, which brazing alloy is formed in a melting process from the base metal and the blend, and flown to the joint from neighboring areas, elements found in the brazing alloy apart from the base metal elements are Si, B and optionally C, and wherein the base metal has a solidus temperature above 1100° C.

In the brazed product obtained by the method the volume of the formed brazing alloy is calculated from the following formula, see also FIG. 2:

Volume=total area $A$×length of joint

Total area $A=((X-B)/2)\times((X-B)/2)\times\tan \alpha$

Wherein A is total area of the two triangles, X is the total width of the formed joint, B is the part of the formed joint where the volume of the formed brazing alloy in the center of the joint is negligible, and the height is calculated by measuring the angle α, which is the angle of the between tangent of the pressed beam to the base.

The ninth aspect relates to a use of an intermediate product for brazing of heat exchangers, plate reactors, parts of reactors, parts of separators, parts of decanters, parts of pumps, part of valves etc.

The tenth aspect relates to a pre-brazed product for brazing comprising a plates and/or parts of products of base metal having a solidus temperature above 1040° C., which pre-brazed product is obtained by applying a surface layer of a blend on the plates and/or the parts of products of base metal, which blend comprises boron and silicon, the boron is selected from a boron source, and the silicon is selected from a silicon source, wherein the blend comprises boron and silicon in a ratio boron to silicon within a range from about 3:100 wt/wt to about 100:3 wt/wt, preferably within a range from about 5:100 wt/wt to about 1:1 wt/wt, wherein the base metal and the surface layer is exposed to a temperature higher than the solidus temperature of the formed brazing alloy and lower than the solidus temperature of the base metal, and a layer of the brazing alloy is obtained on the surface of the plates and/or the parts of products of base metal.

The present invention relates also to a blend for brazing of joints of base metals and for coatings of base metals, which base metal has a solidus temperature above 1040° C., and the blend comprises boron and silicon, the boron is selected from a boron source, and the silicon is selected from a silicon source. The blend comprises boron and silicon in a ratio boron to silicon within a range from about 3:100 wt/wt to about 100:3 wt/wt, preferably within a range from about 5:100 wt/wt to about 1:1 wt/wt. According to one alternative may the blend also comprise powders of base metal having a solidus temperature above 1040° C. The blend in the paint may comprise particles having a particle size <50 μm.

The base metal of the invention is an alloy comprising elements such as iron (Fe), chromium (Cr), nickel (Ni), molybdenum (Mo), manganese (Mn), copper (Cu), etc. According to one alternative may the base metal be selected from the group consisting of iron-based-alloys, nickel-based alloys, chromium-based alloys, and copper based alloys.

The present invention relates also to a paint comprising a blend of boron and silicon, the boron is selected from a boron source, and the silicon is selected from a silicon source, wherein the blend comprises boron and silicon in a ratio boron to silicon within a range from about 3:100 wt/wt to about 100:3 wt/wt, preferably within a range from about 5:100 wt/wt to about 1:1 wt/wt, and optionally powders of base metal having a solidus temperature above 1040° C., and that the paint also comprises at least one binder selected from the group consisting of solvents, water, oils, gels, lacquers, varnish, binders based on monomers and/or polymers.

According to an alternative may the binder be selected from polyesters, polyethylene, polypropylene, acrylic polymers, met acrylic polymers, polyvinyl alcohol, polyvinyl acetate, polystyrene.

Other embodiments and alternatives are defined by the claims.

In the following will the invention be explained by the use of FIGS. 1 to 6. The figures are for the purpose of demonstrating the invention and are not intended to limit its scope.

DETAILED DESCRIPTION OF THE DRAWINGS

Figure 1:
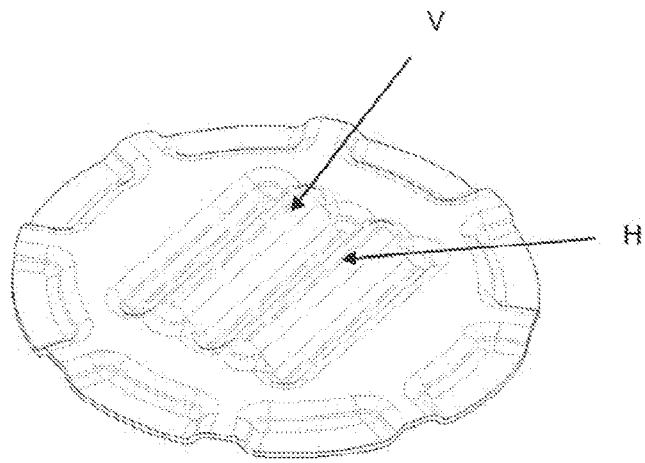
FIG. 1 is showing a circular pressed plate use in the Examples.

FIG. 1 is showing a circular pressed plate, which is 42 mm in diameter and 0.4 mm thick, made of stainless steel type 316L. The pressed plate had two pressed beams V and H, each app 20 mm long. Beam V or v stands for left beam and beam H or h stands for right beam, and v and h are used in Examples 5 and 9.

Figure 2:
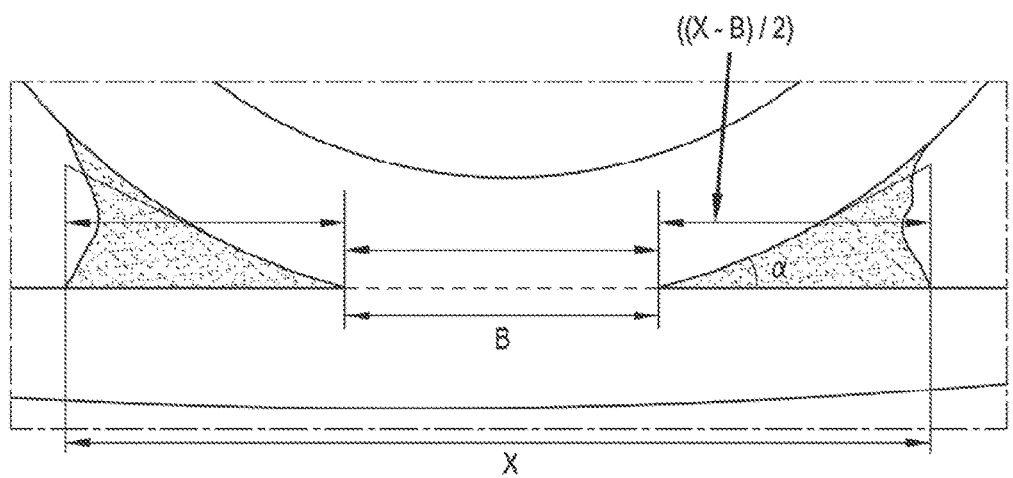
FIG. 2 is showing a graph of "Approximation".

FIG. 2 shows approximation 1 which is based on a cross section of a brazed test sample. The cross section in FIG. 2 shows the pressed beam in the top of FIG. 2. In the bottom of FIG. 2 is the flat, earlier applied plate. In the capillary between the beam and the flat surface a joint is created. To estimate the amount of braze alloy created in the joint following approximations and calculations have been made. It has been estimated that the volume in the center of the joint is negligible. Therefore, the created braze alloy volume for joints with a width, i.e. width B of 1.21 mm or less, are set to zero. On the outer sides of the beam, i.e. ((X−B)/2), formed braze alloy has been accumulated. Thus, the brazing alloy in melted form has been transported by capillary forces to the area of the joint mainly from neighboring areas forming the volumes braze alloy of the triangles.

Figure 3:
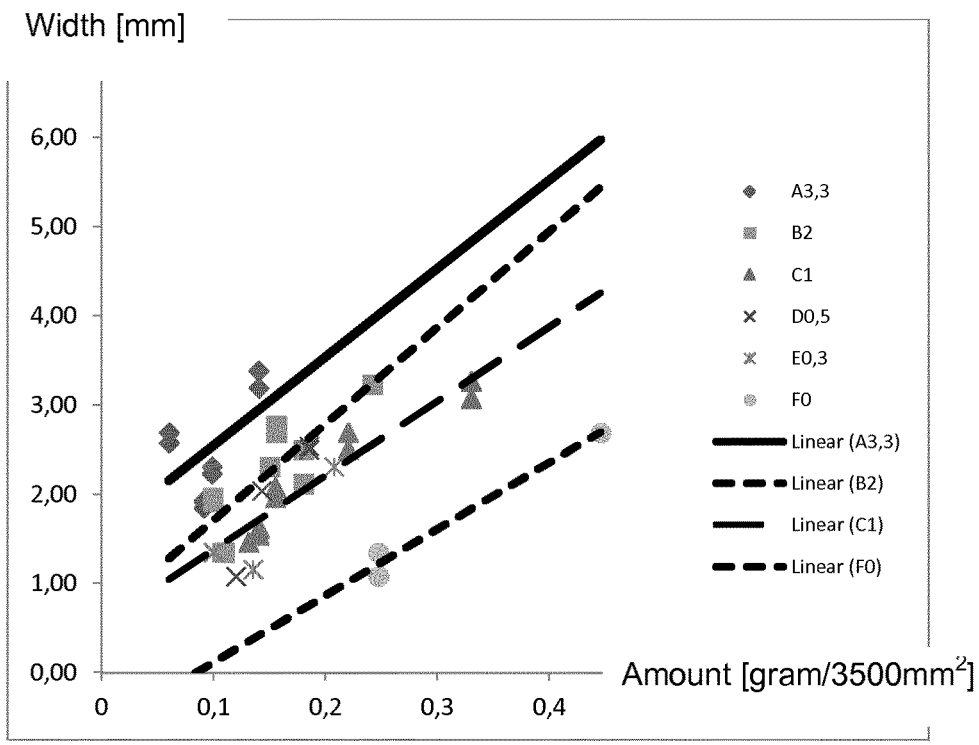
FIG. 3 is showing a diagram wherein the measured width as a function of applied amount (g/3500 mm²) with trend lines.

According to FIG. 2, it is possible to calculate an area by estimate that two triangles are formed on each side of the centre of the joint. The angle in the triangle is measured to app. 28°. The total measured width is called X and the center width, B. The total area (A) of the two triangles are therefore $A=2\times(((X-B)/2)\times((X-B)/2)\times\tan(\alpha)))/2$, i.e. for FIG. 2 $A=2\times(((X-1.21)/2)\times((X-1.21)12)\times\tan(28)))/2$. The total created volume of braze alloy, which had flown to the crevices, would be the area times the length of the two beams. Some of the formed braze alloy does not flow to the crevices and is left on the surface. FIG. 3 is showing a diagram wherein the measured width as a function of applied amount (g/3500 mm$^2$) with trend lines. The results of the fillet test are shown in table 8 and 9 of Example 5 and in FIG. 3. The trend lines of FIG. 3 are base on $Y=K\times X+L$. The results of the measured widths and the estimated areas are illustrated in the diagrams of FIG. 3. The applied amounts, see Tables 8 and 9, were from 0.06 gram/3500 mm$^2$ to 0.96 gram/3500 mm$^2$, which correspond to from app 0.017 mg/mm$^2$ to 0.274 mg/mm$^2$, to be compared with app 1.3-5.1 mg of blend per mm$^2$ used in Example 2.

The trend line $Y=K\times X+L$ for the blend were measured, Y is the joint width, K is the inclination of the line, X is the applied amount of blend and L is a constant, see FIG. 3. Thus, the width of braze joint:

$Y$(width for $A3.3$)=1.554+9.922×(applied amount of blend $A3.3$)

$Y$(width for $B2$)=0.626+10.807×(applied amount of blend $B2$)

$Y$(width for $C1$)=0.537+8.342×(applied amount of blend $C1$)

$Y$(width for $F0$)=0.632+7.456×−(applied amount of blend $F0$)

As observed from FIG. 3 blends A3.3 out of blends A3.3, B2, C1, D0.5, E0.3 and F0 give the highest amount of braze alloy in the joint as a function of applied amount of blend. Sample F0 did not give any substantial joints below 0.20 gram per 3500 mm$^2$.

Figure 4:
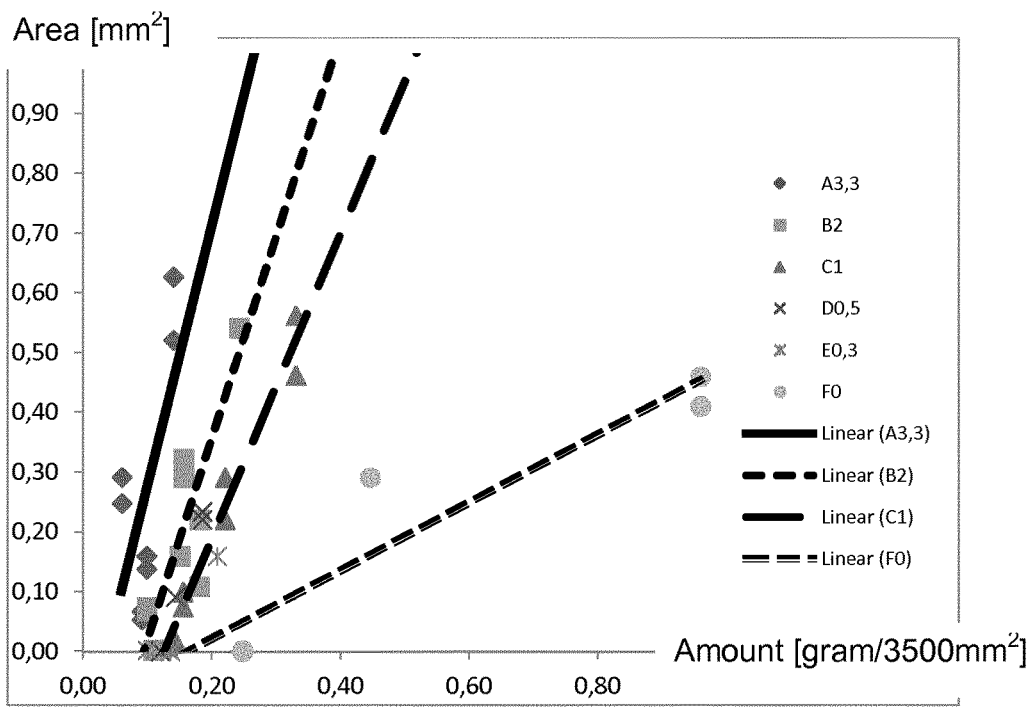
FIG. 4 is showing another diagram in which calculated filled area of the braze joint based on the measured width as a function of applied amount (g/3500 mm²) with trend lines.

FIG. 4 is showing another diagram in which calculated filled area of the braze joint based on the measured width as a function of applied amount (gram/3500 mm$^2$) with trend lines. The trend line $Y=K\times X-L$ for the blend were measured, Y is the area, K is the inclination of the line, X is the applied amount of blend and L is a constant, see FIG. 4.

$Y$(area for $A3.3$)=4.361×(applied amount of blend $A3.3$)−0.161

$Y$(area for $B2$)=3.372×(applied amount of blend $B2$)−0.318

$Y$(area for $C1$)=2.549×(applied amount of blend $C1$)−0.321

$Y$(area for $F0$)=0.569×(applied amount of blend $F0$)−0.093

A rough estimation on the created volume based on the diagram in FIG. 4 for e.g. an amount of 0.18 gram per 3500 mm$^2$, excluding sample F0, due to "no" braze joints and sample D0.5 due to too little data, gives a value for the samples for created volume of braze alloy in the joint between the two beams, see below.

Volume($A3.3$)=0.63×length 40(20×2)=25.2 mm$^3$

Volume($B2$)=0.30×length 40(20×2)=12.0 mm$^3$

Volume($C1$)=0.12×length 40(20×2)=4.8 mm$^3$

Volume($E0.3$)=0.10×length 40(20×2)=4.0 mm$^3$

Figure 5:
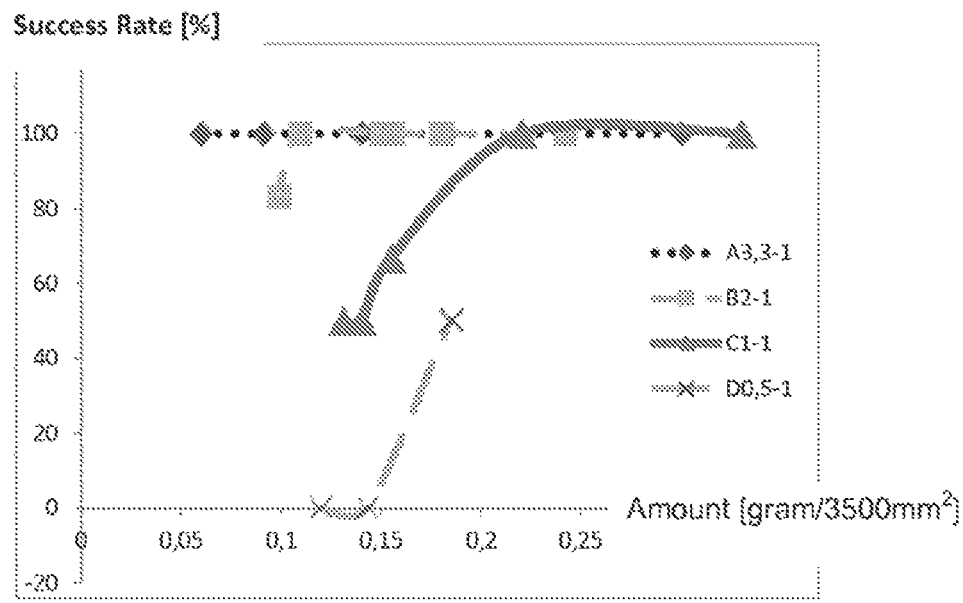
FIG. 5 is showing another diagram in which the % of the tensile tested samples where the joint was stronger or the same as the than the plate material as a function of applied amount of blend (gram per 3500 mm²)

FIG. 5 is showing another diagram in which the % (percent) is the success rate of the tensile tested samples where the joint was stronger or the same as the plate material as a function of applied amount of blend, i.e. gram per 3500 mm$^2$. When the plate was stronger than the joint, resulting in a split of the joint, the result was set to zero. For the samples that the joint were stronger than the plate material the difference in results was not statistical significant.

Figure 6:
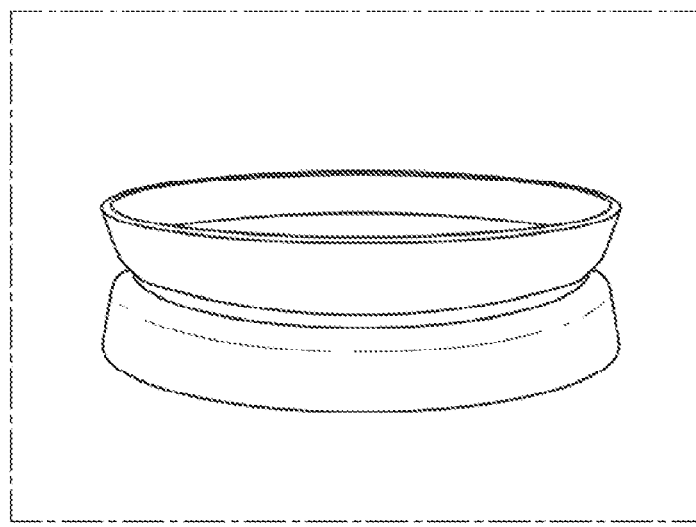
FIG. 6 is showing picture of one of the samples after joining.

In the picture of FIG. 6 is one of the samples shown after joining. The picture shows that there is a formed joint between the two pieces. The joined sample is from Example 10.

The invention is explained in more detail in by means the following Examples and the Examples are for illustrating the invention and are not intended to limit the scope of invention.

EXAMPLES

The tests in these Examples were made to investigate if silicon, Si, were able to create a braze ally when silicon was applied on the surface of a test sample of base metal. Also different amounts of boron, B, were added since boron can decrease the melting point for braze alloys. Boron can also change the wetting behavior of braze alloys. Properties of the tested blends were also investigated. In the Examples wt % is percent by weight and atm % is percent of atoms.

If nothing else is stated the test samples of base metal for all tests were cleaned by dish washing and with acetone before samples of the blends of silicon and boron were added to the test samples.

Example 1: Preparation of Samples of Blends of Silicon and Boron to be Tested

Test sample No. C1 was prepared by blending 118.0 gram of crystalline silicon powder particle size 325 mesh, 99.5% (metal basis) 7440-21-3 from Alfa Aesar-Johnsson Matthey Company, with 13.06 gram of crystalline boron powder particle size 325 mesh, 98% (metal basis) 7440-42-8 from Alfa Aesar-Johnsson Matthey Company and 77.0 gram of Nicorobraz S-30 binder from Wall Colmonoy in a Varimixer BEAR from Busch & Holm producing 208 gram of paste, see sample C1. All test samples were produces following the same procedure as test sample C1. The samples are summarised in Table 2.

TABLE 2

| Sample No. | Boron [gram] | Silicon [gram] | S-30 Binder [gram] | Total Weight [gram] |
|---|---|---|---|---|
| F0 | 0.00 | 124.7 | 73.3 | 198 |
| E0.3 | 4.30 | 123.9 | 72.1 | 200 |
| D0.5 | 6.41 | 121.2 | 75.0 | 203 |
| C1 | 13.06 | 118.0 | 77.0 | 208 |
| B2 | 24.88 | 104.5 | 72.81 | 202 |
| A3.3 | 11.46 | 22.9 | 19.3 | 54.0 |

Samples G15, H100, I66 and J was prepared the same way as samples F0, E0.3, D0.5, C1, B2 and A3.3 with the exception that another binder was used, the binder was Nicorobraz S-20 binder from Wall Colmonoy. The test samples are summarised in Table 3.

TABLE 3

| Sample No. | Boron [gram] | Silicon [gram] | S-20 Binder [gram] | Total Weight [gram] |
|---|---|---|---|---|
| G15 | 0.37 | 2.24 | 3.1 | 5.7 |
| H100 | 4.19 | 0 | 5.3 | 9.5 |
| I66 | 1.80 | 2.70 | 5.5 | 10.0 |
| J | 2.03 | 2.02 | 5.0 | 9.0 |

The samples are also calculated to show ratio, percent by weight and percent by atoms, these are shown in Table 4

TABLE 4

| Blend Sample No. | Ratio [wt/wt] | | Amount [wt %] | | Amount [atm %] | |
|---|---|---|---|---|---|---|
| | Boron | Silicon | Boron | Silicon | Boron | Silicon |
| F0 | 0 | 100 | 0 | 100 | 0 | 100 |
| E0.3 | 3 | 100 | 3 | 97 | 8 | 92 |
| D0.5 | 5 | 100 | 5 | 95 | 12 | 88 |
| C1 | 10 | 100 | 9 | 91 | 21 | 79 |
| B2 | 19 | 100 | 16 | 84 | 33 | 67 |
| A3.3 | 33 | 100 | 25 | 75 | 46 | 54 |
| G15 | 17 | 100 | 14 | 86 | 30 | 70 |
| H100 | 100 | 0 | 100 | 0 | 100 | 0 |
| I66 | 66 | 100 | 40 | 60 | 63 | 37 |
| J | 100 | 100 | 50 | 50 | 72 | 28 |

Measure of Binder (Polymeric and Solvent) Content in the S-20 and S-30 Binder.

Also the content of "dry" material within the gels was tested. Samples of S-20 and S-30 were weight and thereafter placed in an oven for 18 hours at 98° C. After the samples had been taken out of the oven they were weight again. The results can be found in Table 5.

TABLE 5

| Sample | Before [gram] | After [gram] | Polymeric proportion [wt %] |
|---|---|---|---|
| S-20 | 199.64 | 2.88 | 1.44 |
| S-30 | 108.38 | 2.68 | 2.47 |

Example 2: Brazing Tests

When testing braze fillers of the prior art, the weight of the applied braze filler is 2.0 gram which correspond to 0.2 gram of silicon. Since blends of silicon and boron were to be tested similar amounts of silicon and boron in the tested compositions were used. The braze filler contains 10 wt % silicon, therefore 0.2 gram of blends of silicon and boron were applied on the test samples. The test samples were circular test pieces having a diameter of 83 mm and a thickness of 0.8 mm and the test pieces were made of stainless steel type 316L. Since it was not expected that 0.2 gram of braze blend would correspond to 2 gram of braze alloy because a "formed braze alloy" may first be created from the base metal and the braze blend, before it would flow, and that silicon and boron might only diffused into the base metal or even not melt the base metal a higher amount 0.4 gram was also tested. All samples were brazed in a vacuum furnace at 1210° C. for 1 hour. Double tests were used. Meaning, two weights, double test samples and six different blends, 2×2×6=24 samples, i.e. F0, E0.3, D0.5, C1, B2 and A3.3. The blends were applied on a circular area having a diameter of app 10 to 14 mm, i.e. a surface of 78 to 154 mm$^2$ or app 1.3-5.1 mg of blend per mm$^2$.

Results

It was clearly observed that the test pieces of the base metal had melted and some type of melts were created. It was also observed that the melts in some aspects appeared as a braze alloy with flow. Without measuring the size of the wetting it appeared that an increased amount boron in the blends resulted in better wetting. However it was also seen that for most samples the whole thickness had melted and a hole was created in the middle of the test piece. For the "0.2 gram samples" five out of twelve test pieces had holes, and for the "0.4 gram pieces" ten out of twelve.

One conclusion is therefore that it is not possible to change from a braze filler paste or the like and apply spots or lines with "comparative equal amounts" of blends of silicon and boron, since the blends of silicon and boron will melt a hole in the base metal if the test sample is thin, in this case 0.8 mm. If thicker test samples are used no holes might appear, but, "ditches" might be created in the base metal. This could be prevented or be improved by adding base metal as e.g. powder in silicon and boron blends. If only silicon is applied, i.e. sample F0, the result appear to have less flow and wetting properties than the other samples wherein both silicon and boron are applied.

Example 3: New Applying Procedure

In this Example the test plates were prepared for all fillet tests, corrosion tests and the tensile tests at the same time. From Example 2 it was concluded that the blends of silicon and boron it could be a risk to apply the blend in dots or lines on thin walled plates. Therefore, new test samples, i.e. test plates, were used for application of the different the blends of Si and B for the fillet tests, corrosion tests, and the tensile tests.

Accordingly, the new test samples were plates made of stainless steel type 316L. The size of the plates were 100 mm wide, 180 to 200 mm long and the thickness were 0.4 mm. All plates were cleaned by dish washing and with acetone before application of samples of the blends of Si and B. The weight was measured. On each plate a part measured as 35 mm from the short side was masked.

The different test blends A3.3, B2, C1, D0.5, E0.3, F0, G15, H100, and I66 were used. The test plates were "painted" with the blends on the unmasked surface area, which surface area had the size of 100 mm×35 mm. The binder was S-30. After drying for more than 12 hours in room temperature the masking tape was removed and the plate weight was measured for each plates. The weight presented in Table 6 below is the eight of the totally amount of the blends on the area of 100 mm×35 mm=3500 mm$^2$=35 cm$^2$.

TABLE 6

| Test Plate No. | Ratio B:Si [wt/wt] | Weight of blend + dried binder [gram] | Weight of blend Si + B without binder [gram] | Weight of blend per area [mg/cm²] |
|---|---|---|---|---|
| A3.3 | 33:100 | 0.0983 | 0.0959 | 2.74 |
| B2 | 19:100 | 0.0989 | 0.0965 | 2.76 |
| C1 | 10:100 | 0.1309 | 0.1277 | 3.65 |
| D0.5 | 5:100 | 0.1196 | 0.1166 | 3.33 |
| E0.3 | 3:100 | 0.0995 | 0.0970 | 2.77 |
| H100 | 100:0 | 0.1100 | 0.1073 | 3.07 |
| I66 | 66:100 | 0.0900 | 0.0878 | 2.51 |

Example 4: Corrosion-Bend Test of the Samples

From the test plates were slices cut out having width of 35 mm, meaning an applied surface area of 35 mm×35 mm. Onto this surface area was a circular pressed plate placed, see FIG. 1, which press plate had a size of 42 mm in diameter and 0.4 mm thick made of stainless steel type 316L. The test samples were brazed 1 hour at 1210° C. The tested plates for the corrosion tests had applied blend samples A3.3, B2, C1, D0.5, E0.3, H100, I66 and J, see Table 4.

The samples were tested according to corrosion test method ASTM A262, "Standard Practices for Detecting Susceptibility to inter-granular Attack in Austenitic Stainless Steels". "Practice E-Copper-Copper Sulfate-Sulfuric Acid. Test for Detecting Susceptibility to Inter-granular Attack in Austenitic Stainless Steels", was selected from the test method. The reason for selecting this corrosion tests were that there is a risk that boron might react with chromium in the steel creating chromium borides, mainly in the grain boundaries, and then increases the risk for inter-granular corrosion attack, "practice" in the standard were used, boiling 16% sulfuric acid together with copper sulfate in 20 hours and thereafter a bend test, according to chapter 30 in the standard.

Results from the Corrosion Test and Sectioning of the Test Samples

The test pieces were bent tested according to the corrosion test method in chapter 30.1. None of the samples gave indications of inter granular attack at the ocular investigation of the bended surfaces. After the ASTM investigation the bended test samples were cut, ground and policed and the cross section was studied in light optical microscope in EDS, i.e. Energy Dispersive Spectroscopy. The results are summarized in Table 7.

TABLE 7

| Sample No. | Ocular investigation of surface for corrosion cracks when bended according to the ASTM test | Results of metallurgical investigation of the cross sectioned corrosion tested samples and bent tested test samples. SEM-EDS result of cracked phase |
|---|---|---|
| A3.3 | No cracks | No corrosion<br>A surface layer of app. max 8 μm with a few cracks. The phase that had cracked had a high Cr and B content, most probably a chromium boride phase. |
| B2 | No cracks | No corrosion<br>A surface layer of app. max 8 μm with a few cracks. The phase that had cracked had a high Cr and B content, most probably a chromium boride phase |
| C1 | No cracks | No corrosion or cracks |
| D0.5 | No cracks | No corrosion or cracks |
| E0.3 | No cracks | No corrosion<br>A surface layer of app. max 60 μm with a few cracks. The phase that had cracked had a high Si content generally <5 wt % |
| H100 | No cracks | Corroded surface and joint |
| I66 | No cracks | No corrosion<br>A surface layer of app. max 12 μm with a few cracks. The phase that had cracked had a high Cr and B content, most probably a chromium boride phase |
| J | No cracks | No corrosion<br>A surface layer of app. max 20 μm with a few cracks. The phase that had cracked had a high Cr and B content, most probably a chromium boride phase |

Comments

Apparently when adding high amounts of boron, as for sample H100, J, I66, a fragile phase was formed on the surface, most probably a chromium boride phase, increasing with the amount of boron. A fragile phase was not seen in the H100 sample, most probably due to the corrosion on the surface. Also the amount of borides increased with the amount of boron, meaning it has to be taken into consideration that the corrosion properties might decrease when adding high amounts of boron, as for sample H100 that was attacked in the corrosion test. "The negative" effect with boron can be decreased by using thicker base metals and/or longer diffusion times. It is then possible to "dilute" boron in the base metal. Also for the normal amount of boron as for A3.3 and B2 a thinner fragile surface layer was formed. It was seen that for the low amount of boron in the samples, sample E0.3, a quite thick fragile surface layer, with a high silicon content generally >5 wt % of silicon, was formed with a different characteristic than for the fragile surfaces for A3.3, B2, H100, I66 and J. "The negative" effect with silicon can be decreased by using thicker base metals and/or longer diffusion times. It is then possible to "dilute" silicon in the base metal.

Example 5: Fillet Test of the Samples

From test samples made according to Example 3, slices of the plates was cut out with the width of 35 mm, meaning an applied surface of 35 mm×35 mm. Onto this surface was placed a circular pressed plate, see FIG. 1, 42 mm in diameter and 0.4 mm thick, made of stainless steel type 316L. The pressed plate had two pressed beams, each app 20 mm long. The samples were brazed at app 1 hour at app 1200° C.

The results from the fillet test show that there were the amounts of braze alloy found in the joint area created between the flat surface area onto which surface area the blends were applied, which flat surface area was in contact with a pressed beam in the test sample seen in FIG. 1. The amount of braze alloy was calculated by an approximation, see FIG. 2, by calculate an area by estimate that two triangles are formed on each side of the centre of the joint. In the middle part there is no or very small amounts of additional formed "brazing alloy". The two triangles can be measured by measuring the height (h) and the base (b), the total area of the two triangles are summing up to (h)×(b) since there are two triangles. The problem with this calculation is that the height is hard to measure. Therefore we use the following equation for calculating of the two triangle areas:

$$A = ((X-B)/2) \times ((X-B)/2) \times \tan \alpha$$

A is total area of the two triangles, X is the total width of the formed joint, B is the part of the formed joint where the volume of the formed brazing alloy in the center of the joint is negligible. Thus, the base of each triangle is (X−B)/2. The height is calculated by measuring the angle α, which is the angle between the tangents of the pressed beam to the base.

To calculate the volume of the total created volume of the formed braze alloy that had flown to the crevices, would be to measure the length of the two beams, i.e. each beam is 20 mm, and multiply the length and the total area.

The area of two triangles is the estimated area after brazing in Table 8 and 9. The volume is the volume of the formed brazing alloy on one of the beams. The results from the fillet test are shown in table 8 and 9, and in FIG. 3. In Table 8 and in Table 9 v and h stand for v=left beam and h=right beam.

TABLE 8

| Sample No. | Applied binder Si + B [gram] | Width [mm] | Estimated Area after brazing [mm$^2$] | Volume [mm$^3$] |
| --- | --- | --- | --- | --- |
| A3.3x-1v | 0.06 | 2.69 | 0.29 | 5.8 |
| A3.3x-1h | 0.06 | 2.58 | 0.25 | 5.0 |
| A3.3-1v | 0.10 | 2.23 | 0.14 | 2.8 |
| A3.3-1h | 0.10 | 2.31 | 0.16 | 3.2 |
| A3.3-2v | 0.14 | 3.38 | 0.63 | 12.6 |
| A3.3-2h | 0.14 | 3.19 | 0.52 | 10.4 |
| A3.3-3v | 0.09 | 1.92 | 0.07 | 1.4 |
| A3.3-3h | 0.09 | 1.85 | 0.05 | 1.0 |
| B2X-1v | 0.18 | 2.12 | 0.11 | 2.2 |

TABLE 8-continued

| Sample No. | Applied binder Si + B [gram] | Width [mm] | Estimated Area after brazing [mm$^2$] | Volume [mm$^3$] |
| --- | --- | --- | --- | --- |
| B2X-1h | 0.18 | 2.50 | 0.22 | 4.4 |
| B2X-2v | 0.15 | 2.31 | 0.16 | 3.2 |
| B2X-2h | 0.15 | 2.31 | 0.16 | 3.2 |
| B2-1v | 0.10 | 1.96 | 0.07 | 1.4 |
| B2-1h | 0.10 | 1.92 | 0.07 | 1.4 |
| B2-2v | 0.24 | 3.23 | 0.54 | 10.8 |
| B2-2h | 0.24 | 3.23 | 0.54 | 10.8 |
| B2-3v | 0.16 | 2.77 | 0.32 | 6.4 |
| B2-3h | 0.16 | 2.69 | 0.29 | 5.8 |
| B4v | 0.11 | 1.35 | 0.00 | 0 |
| B4h | 0.11 | 1.35 | 0.00 | 0 |

Measured valued for the fillet test, samples A3.3 - B2/B4

TABLE 9

| Sample No. | Applied binder Si + B [gram] | Width [mm] | Estimated Area after brazing [mm$^2$] | Volume [mm$^3$] |
| --- | --- | --- | --- | --- |
| C1X-1v | 0.22 | 2.50 | 0.22 | 4.4 |
| C1X-1h | 0.22 | 2.69 | 0.29 | 5.8 |
| C1X-2v | 0.33 | 3.08 | 0.46 | 9.2 |
| C1X-2h | 0.33 | 3.27 | 0.56 | 11.2 |
| C1-1v | 0.13 | 1.46 | 0.01 | 0.2 |
| C1-1h | 0.13 | 1.46 | 0.01 | 0.2 |
| C1-2v | 0.15 | 1.96 | 0.07 | 1.4 |
| C1-2h | 0.15 | 2.08 | 0.10 | 2.0 |
| C1-3v | 0.14 | 1.54 | 0.01 | 0.2 |
| C1-3h | 0.14 | 1.62 | 0.02 | 0.4 |
| D0.5-1v | 0.19 | 2.54 | 0.23 | 4.6 |
| D0.5-1h | 0.19 | 2.50 | 0.22 | 4.4 |
| D0.5-2v | 0.12 | 1.08 | 0.00 | 0 |
| D0.5-2h | 0.12 | 1.08 | 0.00 | 0 |
| D0.5-3v | 0.14 | 2.04 | 0.09 | 1.8 |
| D0.5-3h | 0.14 | 2.04 | 0.09 | 1.8 |
| E0.3-1v | 0.13 | 1.15 | 0.00 | 0 |
| E0.3-1h | 0.13 | 1.15 | 0.00 | 0 |
| E0.3-2v | 0.21 | 2.31 | 0.16 | 3.2 |
| E0.3-2h | 0.21 | 2.31 | 0.16 | 3.2 |
| E0.3-3v | 0.10 | 1.35 | 0.00 | 0 |
| E0.3-3h | 0.10 | 1.35 | 0.00 | 0 |
| F0-1h | 0.45 | 2.69 | 0.29 | 5.8 |
| F0-2v | 0.25 | 1.08 | 0.00 | 0 |
| F0-2h | 0.25 | 1.35 | 0.00 | 0 |
| F0-3v | 0.96 | 2.96 | 0.41 | 8.2 |
| F0-3h | 0.96 | 3.08 | 0.46 | 9.2 |

Measured valued for the fillet test for samples C1 to F0

The results of the measured widths and the estimated areas are presented in the Tables 8 and 9, and illustrated in the diagrams of FIG. 3. The applied amounts, see Tables 8 and 9, were from 0.06 gram/3500 mm$^2$ to 0.96 gram/3500 mm$^2$, which correspond to from app 0.017 mg/m$^2$ to 0.274 mg/mm$^2$, to be compared with app 1.3-5.1 mg of blend per mm$^2$ used in Example 2.

The trend line Y=K×X+L for the blend were measured, Y is the joint width, K is the inclination of the line, X is the applied amount of blend and L is a constant, see FIG. 3. Thus, the width of braze joint:

$Y$(width for $A3.3$)=1.554+9.922×(applied amount of blend $A3.3$)

$Y$(width for $B2$)=0.626+10.807×(applied amount of blend $B2$)

$Y$(width for $C1$)=0.537+8.342×(applied amount of blend $C1$)

$Y$(width for $F0$)=0.632+7.456×−(applied amount of blend $F0$)

As observed from the diagram blends A3.3 out of blends A3.3, B2, C1, D0.5, E0.3 and F0 give the highest amount of braze alloy in the joint as a function of applied amount of blend. Sample F0 did not give any substantial joints below 0.20 gram per 3500 mm².

The trend line Y=K×X−L for the blend were measured, Y is the area, K is the inclination of the line, X is the applied amount of blend and L is a constant, see FIG. 4.

$$Y(\text{area for } A3.3)=4.361\times(\text{applied amount of blend } A3.3)-0.161$$

$$Y(\text{area for } B2)=3.372\times(\text{applied amount of blend } B2)-0.318$$

$$Y(\text{area for } C1)=2.549\times(\text{applied amount of blend } C1)-0.321$$

$$Y(\text{area for } F0)=0.569\times(\text{applied amount of blend } F0)-0.093$$

A rough estimation on the created volume based on the diagram in FIG. 4 for e.g. an amount of 0.18 gram per 3500 mm², excluding sample F0, due to "no" braze joints and sample D0.5 due to too little data, gives a value for the samples for created volume of braze alloy in the joint between the two beams, see below.

$$\text{Volume}(A3.3)=0.63\times\text{length } 40(20\times2)=25.2 \text{ mm}^3$$

$$\text{Volume}(B2)=0.30\times\text{length } 40(20\times2)=12.0 \text{ mm}^3$$

$$\text{Volume}(C1)=0.12\times\text{length } 40(20\times2)=4.8 \text{ mm}^3$$

$$\text{Volume}(E0.3)=0.10\times\text{length } 40(20\times2)=4.0 \text{ mm}^3$$

Also blends with higher proportion of boron were tested e.g. sample G15, H100, I66 and J. All tested samples did work quite similar to blend A3.3 and B2 regarding the created braze alloy volume. However the metallurgical cross section of the brazed samples showed that the amount of borides was greater and for sample H100, i.e. pure boron, also brittle high chromium phases were found on the surface where the blend earlier was applied. The hard phases were most probably chromium borides, which decreases the chromium content in the surrounding material, decreasing the corrosion resistance. This may be an issue when good corrosion resistance is wanted but is not an issue for non-corrosive environment. The effect of boron could be decreased by changing the heat treatment and or by using a thicker base metal that can "absorb" a greater amount of boron. For a thicker material ≥1 mm this effect in the surface will also be less severe since the proportion of the surface volume compared to the base metal volume is much less than for a thin material <1 mm or <0.5 mm. The chromium borides could be an advantage if better wear resistance is wanted. The metallurgical investigation also showed that for sample F0, i.e. pure silicon, a thick brittle silicon containing phase was found, with a thickness of >50% of the plate thickness for some areas in the investigated sample. The similar phase was also found in the joint. Cracks were found in this phase, with a length >30% of the plate thickness. Such cracks will decrease the mechanical performance of the joined product and can be initiating points for corrosion and or fatigue cracks. The average measured hardness of the phase was over 400 Hv (Vickers). This brittle phase is probably much harder to decrease, compared to the by boride phase, using thicker base metal or a change in heat treatment. Still for thicker base metal this effect can be less severe.

Example 6: Tensile Test of Brazed Joint

The original applied test plates were sliced into slices. The size of the sliced samples was app 100 mm wide, 180 to 200 mm long and the thickness 0.4 mm. The applied area for each slice was then 10 mm times 35 mm=350 mm². On the applied area a thicker part, 4 mm, of stainless steel type 316L was placed covering 30 mm of the total 35 mm applied surface. The ticker part was placed at the end of the slice leaving 5 mm of applied surface not covered by the thick plate. By doing this a decrease in the plate material strength due to the applied blend would be detected when tensile testing if the joint is stronger than the plate. The thicker plate was also wider than the 10 mm slices. All test samples were brazed at app 1200° C. for app 1 hour.

After brazing the thick part was mounted horizontally in a tensile test machine. The braze slice was firmly bent to 90° to a vertical direction. The samples were mounted so that they could move in horizontal direction. The samples were then loaded and the braze joint were split.

Results

When the plate was stronger than the joint, so that the joint were split, the result was set to zero. For the samples that the joint were stronger than the plate material the difference in results was not statistical significant. The results are shown as percent (%) of the tested samples where the joint were stronger than or the same as the plate as a function of applied amount, meaning that the joint was not split when tested. The results are summarized in Table 10 and in the diagram of FIG. 5.

TABLE 10

| Blend of Si + B [gram] | A3.3-1 Success Rate [%] | B2-1 Success Rate [%] | C1-1 Success Rate [%] | D0.5-1 Success Rate [%] |
|---|---|---|---|---|
| 0.0600 | 100 | | | |
| 0.0910 | 100 | | | |
| 0.0989 | | 83 | | |
| 0.1092 | | 100 | | |
| 0.1196 | | | | 0 |
| 0.1309 | | | 50 | |
| 0.1399 | 100 | | | |
| 0.1402 | | | 50 | |
| 0.1428 | | | | 0 |
| 0.1500 | | 100 | | |
| 0.1548 | | | 67 | |
| 0.1558 | | 100 | | |
| 0.1800 | | 100 | | |
| 0.1850 | | | | 50 |
| 0.2200 | | | 100 | |
| 0.2417 | | 100 | | |
| 0.3000 | 100 | | | |
| 0.3300 | | | | 100 |

Example 7

To establish the relationship between applied amount and the risk for burn through the plates, new tests were performed. For all tests blend B2, see Table 6, was used. To blend B2 was binder S-30 added. The test pieces which were tested were circular having a thickness of 0.8 mm and having a diameter of 83 mm. The base metal in the test plates were stainless steel type 316. For all samples the blend was applied in the center of the test sample. The applied area was 28 mm², i.e. circular spot having a diameter of 6 mm. All test samples were weight before and after application, and the results are summarized in Table 11. Thereafter the test samples were placed in a furnace at room temperature for 12 hours. The samples were weight again.

The test samples were all put in a furnace and were brazed at 1210° C. for app 1 hour. During brazing only the outer edges of each sample were in contact with the fixture material, keeping the plate center bottom surface not in contact with any material during brazing. The reason for keeping the plate center bottom surface free of contacts is that a collapse or a burn through might be prevented if the center material is supported from below by the fixture material.

Applied amount and burn through results for the 0.8 mm samples are summarized in Table 11.

TABLE 11

| Sample No. | Blend of Si + B and additional wet binder S-30 [gram] | Blend of Si + B and additional wet binder S-30 [mg/mm²] | Blend of Si + B and additional dried binder S-30 [mg/mm²] | Calculated amount of Blend of Si + B without binder [mg/mm²] | Burn through [1] or [0] |
|---|---|---|---|---|---|
| 1 | 0.020 | 0.714 | 0.464 | 0.453 | 0 |
| 2 | 0.010 | 0.357 | 0.232 | 0.226 | 0 |
| 3 | 0.040 | 1.429 | 0.928 | 0.905 | 0 |
| 4 | 0.030 | 1.0714 | 0.696 | 0.679 | 0 |
| 5 | 0.050 | 1.786 | 1.161 | 1.132 | 0 |
| 6 | 0.060 | 2.143 | 1.393 | 1.359 | 0 |
| 7 | 0.070 | 2.500 | 1.625 | 1.585 | 0 |
| 8 | 0.080 | 2.857 | 1.857 | 1.811 | 0 |
| 9 | 0.090 | 3.214 | 2.089 | 2.037 | 0 |
| 10 | 0.100 | 3.571 | 2.321 | 2.264 | 0 |
| 11 | 0.110 | 3.928 | 2.554 | 2.491 | 1 |
| 12 | 0.120 | 4.285 | 2.786 | 2.717 | 1 |
| 13 | 0.130 | 4.642 | 3.018 | 2.943 | 1 |
| 14 | 0.150 | 5.357 | 3.482 | 3.396 | 1 |
| 15 | 0.170 | 6.071 | 3.946 | 3.849 | 1 |
| 16 | 0.190 | 6.786 | 4.411 | 4.302 | 1 |
| 17 | 0.210 | 7.500 | 4.875 | 4.755 | 1 |
| 18 | 0.230 | 8.214 | 5.339 | 5.207 | 1 |
| 19 | 0.280 | 10.000 | 6.500 | 6.339 | 1 |
| 20 | 0.290 | 10.357 | 6.732 | 6.566 | 1 |

The tests show that there is a burn through between sample 10 and 11 for a plate having a thickness of 0.8 mm. Sample 10 has 2.264 mg/mm² applied amount of blend and sample 11 has 2.491 mg/mm². For joining plates having thickness less than 1 mm, there is a risk with an amount within the range from about 2.830 mg/mm² to about 3.114 mg/mm² for burning through the plates, the amount in the middle of this range is 2.972 mg/mm². Therefore, for a plate having a thickness less than 1 mm an amount of less than 2.9 mg/mm² would be suitable for avoiding burning through the plate.

Example 8

In Example 8a braze joint between two pressed heat exchanger plates are made in three different ways. The thickness of the heat exchanger plates are 0.4 mm.

In the first and second test samples an iron based braze filler with a composition close stainless steel type 316 were used, see WO 2002/38327. The braze filler had an increased amount of silicon to about 10 wt %, an amount boron to about 0.5 wt % and a decreased amount of Fe of about 10.5 wt %. In the first test sample the braze filler was applied in lines and in the second test sample the braze filler was applied evenly on the surface. In both cases the filler was applied after pressing.

After brazing test sample 1 showed that the braze filler applied in lines was drawn to the braze joints. Some of the braze filler did not flow to the braze joint and therefore increased the thickness locally at the applied line. For test sample 2 the braze filler flowed to the braze joints, however some on the braze filler remained on the surface and increased the thickness. In test samples 1 and 2 the amount of braze filler corresponds to an amount of app 15 wt % of the plate material.

In test sample 3 A3.3 blend was used, see Table 6. The blend was applied before pressing evenly on the plate. The blend was applied in an amount that would create braze joint with similar sizes as for test samples 1 and 2.

Test sample 3 was applied with a layer having a thickness corresponding to a weight of app 1.5 wt % of the plate material. By applying blend A3.3 a braze alloy was formed from the base metal, and the formed braze alloy flow to the braze joints. Accordingly, the thickness of the plate decreased since more material was drawn to the braze joint than added blend on the surface.

Example 9: Tests with Different Si-Sources and B-Sources

The tests which were performed in Example 9 were to investigate alternative boron-sources and silicon-sources. B1 end B2, see Table 6, was selected as reference for the test. The alternative sources were tested with their ability to create a joint. For each experiment either an alternative boron-source or an alternative silicon-source was tested. When using an alternative source the other element influence was assumed to be zero, meaning that it was only the weight of boron or silicon in the alternative component that was "measured", see Table 12. For the reference blend B2, the weight ratio between silicon and boron is 10 gram to 2 gram summing up to 12 gram. Each blend was mixed together with S-30 binder and the blend was applied on a steel plate according to Example 1. All samples were brazed a vacuum furnace at 1210° C. for 1 hour.

TABLE 12

| Sample | Alternative source | Added Amount [Si] [gram] | Added Amount [B] [gram] | Corresponding Amount [Si] [gram] | Corresponding Amount [B] [gram] |
|---|---|---|---|---|---|
| Si—B | Si—B | 10.0 | 2.0 | 10.0 | 2.0 |
| Si—B₄C | B₄C | 10.0 | 2.6 | 10.0 | 2.0 |
| Si—FeB | FeB | 10.1 | 12.5 | 10.1 | 2.0 |
| FeSi—B | FeSi | 30.2 | 2.0 | 10.1 | 2.0 |
| Si—NiB | NiB | 10.1 | 13.0 | 10.1 | 2.0 |

The trend line Y=K×X+L for blend B2 was measured, Y is the joint width, K is the inclination of the line for B2, X is the applied amount of blend and L is a constant for no applied amount of blend B2, see FIG. 3. Thus, the width of braze joint Y=0.626+10,807×(applied amount of blend).

In Table 13 v and h stand for v=left beam and h=right beam as in Example 5.

TABLE 13

| Sample | Applied Amount [gram] | Joint Calculated Width Y [mm²] | Joint Measured Width [mm²] |
|---|---|---|---|
| Si—B₄C - v | 0.22 | 3.0 | 2.69 |
| Si—B₄C - h | 0.22 | 3.0 | 2.88 |
| Si—FeB - v | 0.26 | 3.4 | 1.73 |
| Si—FeB - h | 0.26 | 3.4 | 1.73 |
| FeSi—B - v | 0.29 | 3.8 | 2.1 |
| FeSi—B - h | 0.29 | 3.8 | 2.1 |
| Si—NiB - v | 0.39 | 4.8 | 2.69 |
| Si—NiB - h | 0.39 | 4.8 | 2.88 |

The results in Table 13 show that it is possible to use B4C, NiB and FeB as alternatives source to boron. When NiB were used the created amount was less than for pure boron however NiB could be used if an Ni alloying effect is wanted.

Example 10: Tests of Base Metals

In Example 10 a large number of different base metals were tested. All tests except for the mild steel and a Ni—Cu alloy were tested according to test Y.

For test Y two circular pressed test pieces with a thickness of app 0.8 mm were place onto each other. Each sample had a pressed circular beam. The top faces of the beams were placed towards each other creating a circular crevice between the pieces. For each sample the B2 blend with binder S-20 were applied with a paint brush. The weight of the added amount was not measured since the applying was not homogenous when applying with the paint brush. A picture of one of the samples after joining is presented in FIG. 6.

The mild steel samples and the Ni—Cu samples were applied in the same way, but for mild steel according to the tests made in example 5 "fillet test" and for the Ni—Cu test with two flat test pieces. The samples except for the Ni—Cu were "brazed" in a furnace at app 1200° C., i.e. 1210° C., for 1 h in vacuum atmosphere furnace. The Ni—Cu sample was brazed at app 1130° C. for app 1 h in the same vacuum furnace. After "brazing" a joint was formed between the pieces for all made test and a flow of created "braze alloy" made of the base metal, to the joint was also observed for all tested samples. The results are shown on Table 14.

TABLE 14

| Base metal Sample No. | Cr [wt %] | Fe [wt %] | Mo [wt %] | Ni [wt %] | Cu [wt %] | Mn [wt %] | After Brazing Created joint? | After Brazing Flow of Brazing Alloy? |
|---|---|---|---|---|---|---|---|---|
| 1 | — | 0.3 | — | 99 | — | 0.2 | Yes | Yes |
| 2 | 21 | 0.6 | 16 | 62 | 0.4 | — | Yes | Yes |
| 3 | 22 | 0.7 | 16 | 59 | 1.6 | — | Yes | Yes |
| 4 | 0.6 | 1.9 | 29 | 68 | 0.2 | — | Yes | Yes |
| 5 | 21 | 4.4 | 13 | 58 | — | — | Yes | Yes |
| 6 | 19 | 5.0 | 9.0 | 63 | 0.4 | — | Yes | Yes |
| 7 | 15 | 5.5 | 17 | 60 | — | 0.3 | Yes | Yes |
| 8 | 1.1 | 5.6 | 28 | 63 | 0.6 | 0.4 | Yes | Yes |
| 9 | 19 | 6.2 | 2.6 | 70 | 1.7 | 0.4 | Yes | Yes |
| 10 | 33 | 32 | 1.7 | 33 | 0.4 | 0.6 | Yes | Yes |
| 11 | 27 | 33 | 6.5 | 32 | 1.1 | 1.4 | Yes | Yes |
| 12 | 27 | 36 | 3.4 | 32 | 1.0 | 1.4 | Yes | Yes |
| 13 | 24 | 44 | 7.2 | 23 | 0.3 | 1.5 | Yes | Yes |
| 14 | 20 | 48 | 4.3 | 25 | 1.1 | 1.2 | Yes | Yes |
| 15 | 19 | 50 | 6.3 | 25 | 0.2 | — | Yes | Yes |
| 16 | 20 | 54 | 6.5 | 19 | 0.6 | 0.4 | Yes | Yes |
| 17 | 29 | 64 | 2.4 | 3.5 | — | — | Yes | Yes |
| 18 | 28 | 66 | 2.2 | 3.5 | — | — | Yes | Yes |
| 19 | 0.3 | 1.1 | — | 66 | 31 | 1.6 | Yes | Yes |
| 20 | 0.17 | 99.5 | — | — | — | 0.3 | Yes | Yes |

The results in Table 14 show that braze alloys are formed between the blend and the base metal for each sample 1 to 20. The results show also that joints were created for each tested sample.

The examples show that boron was needed to create substantial amount of braze alloy, could fill the joints and also create strength in the joints. The examples also showed that boron was needed for the microstructure, since a thick fragile phase was found for the samples with no boron.

The invention claimed is:

1. A blend for brazing of joints in products of base metals and/or for coating of products of base metals, which base metal has a solidus temperature above 1040° C., which blend consists of:
   a boron source selected from the group consisting of boron, B₄C, B₄Si, NiB, and FeB; and
   a silicon source selected from the group consisting of silicon, FeSi, SiC, and B₄Si; and
   at least one binder selected from the group consisting of polyesters, polyethylene, polypropylene, polyvinyl alcohol, polyvinyl acetate, and polystyrene,
   wherein boron and silicon of the blend are present in a ratio of boron to silicon within a range from about 3:100 wt/wt to about 100:3 wt/wt, and
   wherein the amount of binder in the blend is 35.7% to 55.5% by weight of the total composition.

2. The blend according to claim 1, wherein the blend is a paint.

3. A blend for brazing of joints in products of base metals and/or for coating of products of base metals, which base metal has a solidus temperature above 1040° C., which blend consists of:
   a boron source selected from the group consisting of boron, B₄C, B₄Si, NiB, and FeB; and
   a silicon source selected from the group consisting of silicon, FeSi, SiC, and B₄Si; and
   at least one binder selected from the group consisting of polyesters, polyethylene, polypropylene, polyvinyl alcohol, polyvinyl acetate, and polystyrene, wherein boron and silicon of the blend are present in a ratio of boron to silicon within a range from about 3:100 wt/wt to about 100:3 wt/wt, and
wherein the silicon source has a particle size less than 250 μm, and
wherein the amount of binder in the blend is 35.7% to 55.5% by weight of the total composition.

4. A blend for brazing of joints in products of base metals and/or for coating of products of base metals, which base metal has a solidus temperature above 1040° C., which blend consists of:
a boron source selected from the group consisting of boron, B$_4$C, B$_4$Si, NiB, and FeB; and
a silicon source selected from the group consisting of silicon, FeSi, SiC, and B$_4$Si; and
at least one binder selected from the group consisting of polyesters, polyethylene, polypropylene, polyvinyl alcohol, polyvinyl acetate, and polystyrene,
powders of the base metal having a solidus temperature above 1040° C.,
wherein boron and silicon of the blend are present in a ratio of boron to silicon within a range from about 3:100 wt/wt to about 100:3 wt/wt, and
wherein the amount of binder in the blend is 35.7% to 55.5% by weight of the total composition.

5. An intermediate product for joining and/or coating by brazing comprising plates and/or parts of products of a base metal and a blend, said base metal having a solidus temperature above 1040° C., wherein the intermediate product has a surface layer formed from the blend on at least part of a surface of the base metal, wherein the blend consists of: a boron source selected from the group consisting of boron, B$_4$C, B$_4$Si, NiB, and FeB, a silicon source selected from the group consisting of silicon, FeSi, SiC, and B$_4$Si, and at least one binder selected from the group consisting of polyesters, polyethylene, polypropylene, polyvinyl alcohol, polyvinyl acetate, and polystyrene, wherein boron and silicon of the blend are present in a ratio of boron to silicon within a range from about 3:100 wt/wt to about 100:3 wt/wt, and wherein the amount of binder in the blend is 35.7% to 55.5% by weight of the total composition.

6. The intermediate product according to claim 5, wherein the base metal has a thickness <1 mm and the blend is applied on the base metal in an average amount less than 2.9 mg/mm$^2$.

7. The intermediate product according to claim 5, wherein the base metal has a thickness >1 mm.

8. The intermediate product according to claim 5, wherein the surface layer is applied as a powder of the blend or by a deposition selected from spray deposit, physical vapor deposition, or chemical vapor deposition.

9. The intermediate product according to claim 5, wherein the base metal is selected from the group consisting of iron based alloys, nickel based alloys, chromium based alloys, and copper based alloys.

10. The intermediate product according to claim 5, wherein the base metal comprises from about 15 to about 22 wt % chromium, from about 8 to about 22 wt % nickel, from about 0 to about 3 wt % manganese, from about 0 to about 1.5 wt % silicon, optionally from about 1 to about 8 wt % molybdenum, and balanced with iron.

11. The intermediate product according to claim 5, wherein the surface layer of the blend is provided on at least one side of a plate or the surface layer of the blend is on both sides of a plate.

12. The intermediate product according to claim 5, wherein the base metal and the surface layer have been exposed to a temperature higher than the solidus temperature of the formed brazing alloy and lower than the solidus temperature of the base metal, and a layer of the brazing alloy has been formed on the base metal surface.

13. The intermediate product according to claim 5, wherein the plates are cut, formed, pressed or combinations thereof before the application of the surface layer, after the application of the surface layer or after forming the brazing alloy on the surface of the base metal.

14. A stacked intermediate product for brazing comprising an intermediate product according to claim 5, wherein the plates are stacked such that the surface layers of the plates are either in contact with a base metal or with another surface layer on another plate.

15. The stacked intermediate product according to claim 14, wherein the stacked plates have no surface layers, single surface layers, double surface layers, and/or combinations thereof.

16. An assembled intermediate product for brazing comprising one or more intermediate products according to claim 5, wherein at least one intermediate product has a thickness >1 mm, and wherein the assembled intermediate product has at least one surface layer in contact with a surface of at least one base metal or in contact with at least one surface layer before brazing, and after brazing brazed joint(s) is (are) obtained.

17. A stacked brazed product obtained by brazing a stacked intermediate product according to claim 14, wherein the stacked intermediate product is brazed at a temperature below 1250° C., in a furnace in vacuum, in an inert gas, in a reducing atmosphere, or combinations thereof forming brazed joints of brazing alloy between the stacked plates or between contact surfaces of the assembled intermediate product, which brazing alloy is formed in a melting process of the base metal and the blend, and the brazing alloy in melted form has been transported by capillary forces to the area of the joint mainly from neighboring areas.

18. An assembled brazed product obtained by brazing an assembled intermediate product according to claim 16, wherein the assembled intermediate product is brazed at a temperature below 1250° C., in a furnace in vacuum, in an inert gas, in a reducing atmosphere, or combinations thereof forming brazed joints of brazing alloy between the stacked plates or between contact surfaces of the assembled intermediate product, which brazing alloy is formed in a melting process of the base metal and the blend, and the brazing alloy in melted form has been transported by capillary forces to the area of the joint mainly from neighboring areas.

19. A method of brazing a product, which method comprises the following steps: (i) applying a blend on plates or parts of products of a base metal, said base metal having a solidus temperature above 1040° C., wherein the blend consists of: a boron source selected from the group consisting of boron, B$_4$C, B$_4$Si, NiB, and FeB, and a silicon source selected from the group consisting of silicon, FeSi, SiC, and B$_4$Si, wherein boron and silicon of the blend are present in a ratio of boron to silicon within a range from about 3:100 wt/wt to about 100:3 wt/wt. and at least one binder selected from the group consisting of polyesters, polyethylene, polypropylene, polyvinyl alcohol, polyvinyl acetate, and polystyrene, wherein the amount of binder in the blend is 35.7% to 55.5% by weight of the total composition,
(ii) obtaining an intermediate product according to claim 5;
(iii) optionally exposing the obtained intermediate product in step (ii) to a temperature higher than the solidus temperature of a brazing alloy formed in a molding process of the base metal and the blend and lower than the solidus temperature of the base metal, and forming a layer of the brazing alloy on the base metal surface;

(iv) assembling or stacking the product from step (ii) or step (iii) with one or more products according to step (ii) or step (iii), or assembling or stacking the product with one or more parts having no blend of silicon and boron, and forming an assembled product or a stacked product;

(v) brazing the assembled or stacked product from step (iv) to a temperature below 1250° C. in a furnace in vacuum, in an inert gas, in a reducing atmosphere or combinations thereof; and (vi) obtaining a brazed product.

20. The method according to claim 19, wherein the brazed product obtained in step (vi) is provided with a joint(s) obtained by forming a brazing alloy in a melting process of the base metal and the blend, and transporting by capillary forces the brazing alloy in melted form to the area of the joint mainly from neighboring areas.

21. The method according to claim 19, wherein step (iv) the product from step (ii) or step (iii) is brazed to a base metal having thickness >1 mm, or brazed to a base metal having a thickness <1 mm, or brazed to one or more intermediate products according to claim 7.

22. The method according to claim 19, wherein the base metal has a thickness <1 mm and the blend is applied on the base metal in an average amount less than 2.9 mg/mm$^2$ calculated on silicon and boron.

23. The method according to claim 19, wherein the product from step (ii) or step (iii) is cut, formed, pressed or combinations thereof obtaining plates.

24. The method according to claim 19, wherein the obtained brazed product is selected from the group consisting of heat exchangers, plate reactors, parts of reactors, parts of separators, parts of decanters, parts of pumps, and parts of valves.

25. A brazed product obtained by the method according to claim 19, wherein joint(s) of the brazed product is (are) obtained by a brazing alloy, which brazing alloy is formed in a melting process of the base metal and the blend, and the brazing alloy in melted form has been transported by capillary forces to the area of the joint mainly from neighboring areas.

26. The brazed product obtained by the method according to claim 19, wherein elements found in the brazing alloy apart from the base metal elements are Si, B and optionally C, and wherein the base metal has a solidus temperature above 1040° C.

27. A pre-brazed product for brazing comprising plates and/or parts of products of a base metal having a solidus temperature above 1040° C., which pre-brazed product is obtained by applying a surface layer formed from a blend on a surface of at least one of the plates and/or the parts of products of the base metal, which blend consists of: a boron source selected from the group consisting of boron, $B_4C$, $B_4Si$, NiB, and FeB, a silicon source selected from the group consisting of silicon, FeSi, SiC, and $B_4Si$, and at least one binder selected from the group consisting of polyesters, polyethylene, polypropylene, polyvinyl alcohol, polyvinyl acetate, and polystyrene, wherein the amount of binder in the blend is 35.7% to 55.5% by weight of the total composition, wherein boron and silicon of the blend are present in a ratio boron to silicon within a range from about 3:100 wt/wt to about 100:3 wt/wt, wherein the base metal and the surface layer has been exposed to a temperature higher than the solidus temperature of a brazing alloy formed in a molding process of the base metal and the base metal and the blend and lower than the solidus temperature of the base metal, and an obtained layer of the brazing alloy is on a surface of at least one of the plates and/or the parts of products of base metal.

* * * * *